United States Patent [19]

Dodington et al.

[11] 4,010,465
[45] Mar. 1, 1977

[54] CHANNEL ENCODING FOR DISTANCE MEASUREMENT EQUIPMENT

[75] Inventors: Sven H. Dodington, Mountain Lakes; Jesse S. LeGrand, Clifton, both of N.J.

[73] Assignee: International Telephone and Telegraph Corporation, Nutley, N.J.

[22] Filed: Apr. 4, 1975

[21] Appl. No.: 565,311

[52] U.S. Cl. .......................... 343/5 LS; 343/6.5 LC; 343/17.2 PC
[51] Int. Cl.² .......................................... G01S 9/56
[58] Field of Search ......... 343/5 LS, 6.5 R, 6.5 LC, 343/6.8 R, 6.8 LC, 17.2 PC

[56] References Cited
UNITED STATES PATENTS

| | | | |
|---|---|---|---|
| 3,418,581 | 12/1968 | Kennedy et al. | 343/6.5 R X |
| 3,573,819 | 4/1971 | Mason et al. | 343/6.5 R |
| 3,825,929 | 7/1974 | Toman | 343/6.5 R |
| 3,870,993 | 3/1975 | Biagi et al. | 343/6.5 R |
| 3,900,873 | 8/1975 | Bouvier et al. | 343/6.5 R X |

Primary Examiner—T.H. Tubbesing
Attorney, Agent, or Firm—John T. O'Halloran; Peter C. Van Der Sluys; Vincent Ingrassia

[57] ABSTRACT

An adapter is provided for insertion between a conventional DME airborne interrogator and antenna. The adapter converts conventional interrogations into phase-coded or amplitude coded signals which are received by new Microwave Landing System (MLS) transponders. Each transponder will process interrogations having the correct code and frequency and will respond with precision reply signals. The precision replies are then received by the airborne equipment, converted back to standard reply pulses and processed to provide distance measurement. Also provided is a new transponder for use at MLS sites.

8 Claims, 55 Drawing Figures

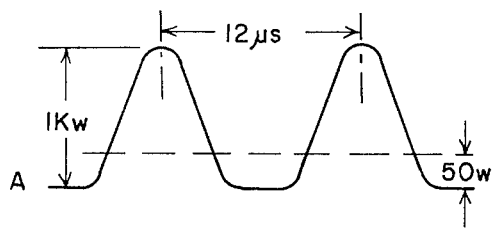 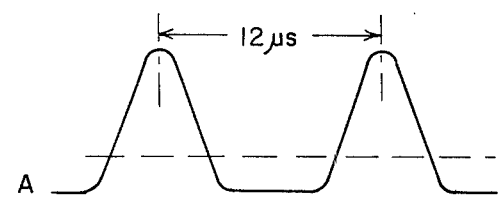
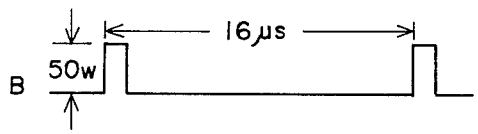 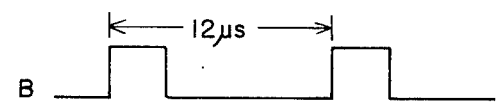
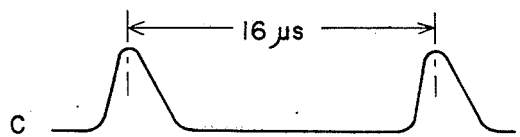 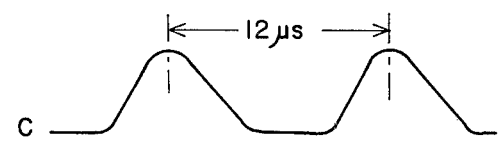
Fig. 1 　　　　　　　　Fig. 2
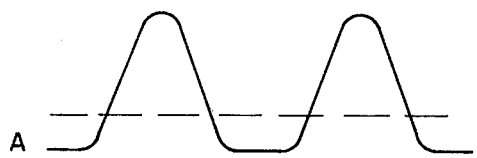 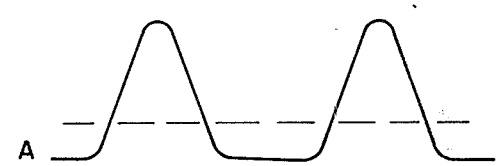
 
 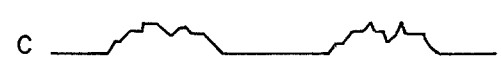
Fig. 3 　　　　　　　　Fig. 4

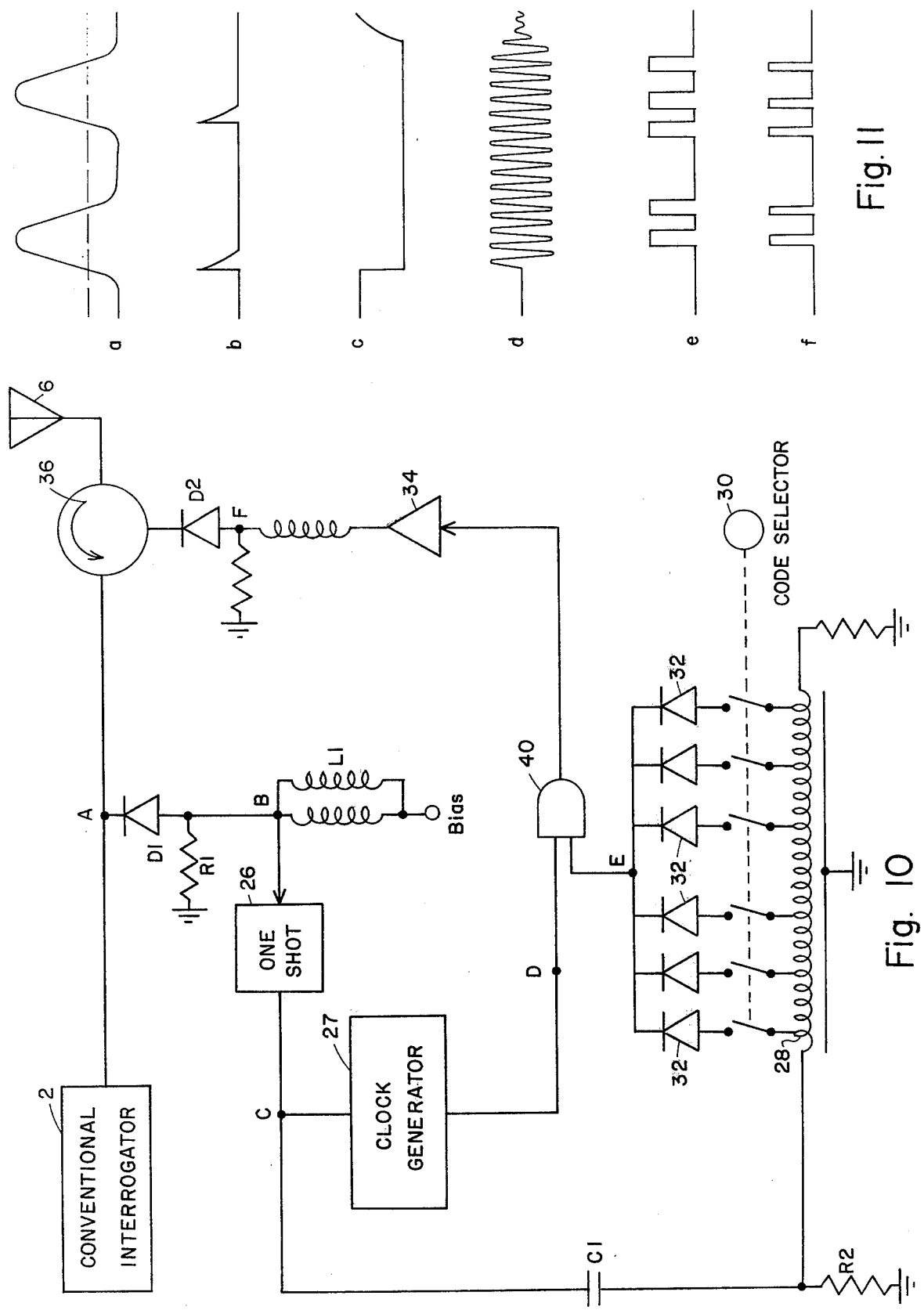

CHANNEL ENCODING FOR DISTANCE MEASUREMENT EQUIPMENT

BACKGROUND OF THE INVENTION

This invention relates to distance measuring equipment (DME) for assisting in the navigation of an aircraft along a desired path, especially DME employing interrogators and transponders and, more particularly, to DME wherein there is required a high degree of accuracy as compared with conventional systems.

Distance measuring equipment (DME) and distance measuring techniques are widely accepted as a navigation and landing aid. The distance of an aircraft from a selected ground beacon is determined by measuring the round trip time of travel of radio pulse signals between the aircraft and the ground beacon. Easy-to-read meters are used on the aircraft to display the distance readings. A ground based radio transponder or beacon produces artificial echoes within a frequency channel which positively identifies the source of the "echo" and hence the geographic location of the transponder. An airborne interrogator containing a transmitter repeatedly initiates the distance measuring process by sending out widely spaced interrogation pulse pairs. The interrogation pulses are then received by the ground beacon, which beacon contains an associated transmitter for sending out reply pulses. The replied pulses are finally picked up by the airborne receiver, and timing circuits automatically measure the round trip travel time or interval between interrogation pulse transmission and receipt of reply pulses. This time interval is then converted into electrical signals which reflect distance from aircraft to beacon on a distance meter.

Since clear frequency channels are used, a ground beacon is not blocked or overloaded by interrogation pulses which are intended for a different beacon, i.e., a beacon receiver will respond only to interrogation pulses that are intended for it, since all other DME interrogations within a given geographical area occur on a different radio frequency.

Also, in the aircraft navigation field there are already known instrument landing systems (ILS) and techniques for use in guiding an aircraft onto a particular airport runway. The approach and landing zone encompasses an area having a radius of approximately 25 to 30 miles. In this zone, the overriding requirement is an extreme degree of precision navigational guidance in order to bring the aircraft safely down on a lateral course aligned exactly with the runway and a path of descent of suitable angle leading to the touchdown point. One known approach employs two approach beacons, one of which defines a guide course in the azimuth plane to direct the aircraft along the runway (localizer beacon) while another defines a glide path course which will guide the aircraft down to a landing point on the runway (glide path beacon).

In the conventional L Band DME systems, standardized by the International Civil Aviation Organization (ICAO), the interrogations and replies comprise pairs of Gaussian pulses, each of 3.5 microseconds duration, with rise times of the order of 2.5 microseconds. The resulting accuracy, limited by this rise-time, is less than what may be desirable for the most stringent applications, such as those associated with the Microwave Landing Systems (MLS). The proposed microwave landing system (MLS) suggested by a special committee of the Radio Technology Commission for Aeronautics requires associated distance measuring equipment which operates on channels adjacent to the angle measuring channels in the 5.0 to 5.25 GHz band (C-Band). 200 channels for each service are required, i.e., 200 DME channels and 200 very high frequency omni range (VOR) bearing channels with 40 VOR channels reserved for ILS. However, many potential users have expressed objections to carrying an extra DME interrogator which would be used only during the last few minutes of flight (during landing) if there is a possibility of using the existing L-Band DME interrogator presently paired with VOR and ILS.

The heaviest use of DME is in the United States where there are approximately 700 DME transponders and approximately 70,000 L-Band DME equipped aircraft. Since each transponder is designed to handle 100 aircraft, the system would appear to be saturated. However, this would only be true if all aircraft were in the air at the same time and all transponders were within the same line-of-sight area. This is not the case. On the average, there are approximately 3200 aircraft in flight in each of ten line-of-sight areas of approximately 600 miles in diameter. Therefore, the average number of aircraft per area is 320. Within each such area, there are on the average 70 transponders. However, there is a potential for 200 transponders since there are 200 channels. The present average loading is therefore $320/70 = 4.5\%$ of capacity, and the potential average loading for 200 transponders is $320/200 = 1.6\%$ of capacity. It is conceded that peak loading may be considerably greater. Current estimates are that 16,000 aircraft may be simultaneously in flight in the United States and that some transponders may reach 60% of capacity. The fact remains, however, that the average loading is light and that this fact can be exploited since MLS is used only during the landing of aircraft, and an aircraft using an L-Band DME is not simultaneously using an enroute or ILS DME.

The International Civial Aviation Organization (ICAO) has required an accuracy of 0.5 mile or 3% of distance, whichever is greater. However, this requirement reflects hardware of 25 years ago, and there hardly exists today any combination of interrogators and transponders which do not exhibit also an order of magnitude improvement in accuracy.

Using the standard 3.50 microsecond Gaussian pulses, it has been demonstrated that accuracies of ± 80 ft. over a signal level change of 60DB are achievable. Further, Tacan sets have been delivered which exhibit a ±40 meter accuracy. These increased accuracies are attributable to (a) digital ranging circuits with accurate clocks; (b) "pilot pulses" in both interrogators and transponders which measure and calibrate out internal interrogator or transponder delay; (c) Instantaneous Automatic Gain Control (IAGC) which employs one-half amplitude finders to reduce delay variations caused by pulse amplitude changes; and (d) first pulse timing to reduce multi-path effects. These techniques are not new but are offered to illustrate means by which C-Band DME systems have achieved a high degree of accuracy. Further, these techniques are well known in the art and a further discussion of them is not deemed necessary.

Recent tests of a C-Band interrogator and transponder calibrated for zero error at touchdown showed a minus 10 ft. error at the far end of the runway and +20 ft. error seven miles from touchdown. This was well within specified limits of ± 20 ft. prescribed by the above mentioned special committee. It must be borne in mind, however, that this accuracy was achieved using pulses having 0.1 microsecond rise time. Further, it should be noted at this time that currently used L-Band interrogators employ pulses having a 2.5 microsecond rise time.

SUMMARY OF THE INVENTION

It is an object of the present invention to provide a high accuracy DME system, operating in L-Band, which system will neither interfere with the presently operating NAV/ILS L-Band system nor will it be interferred with by the present NAV/ILS L-Band system.

It is a further object of the present invention to provide an airborne adapter for use with existing NAV/ILS DME sets which will permit interrogation of MLS beacons, and will receive and process replies from them.

According to a broad aspect of the invention there is provided an apparatus for use in airborne equipment of the type wherein an interrogator transmits an interrogation signal containing a plurality of pulses, comprising means for generating a plurality of N chip coded signals where N is greater than or equal to one; and means for modulating at least one of said plurality of pulses with a particular one of said plurality of coded signals.

The invention further contemplates a ground beacon for receiving and replying to the modulated interrogations and an airborne receiver for receiving ground beacon responses.

The above and other objects of the present invention will be more clearly understood from the following detailed description taken in conjunction with the accompanying drawings in which:

BRIEF DESCRIPTIONS OF THE DRAWINGS

FIG. 1a illustrates a conventional ICAO interrogation signal;

FIG. 1b illustrates one example of a precision interrogation signal according to the invention;

FIG. 1c illustrates the effect of the precision interrogation of FIG. 1b on a conventional transponder receiver;

FIG. 2a illustrates a conventional ICAO reply signal;

FIG. 2b illustrates one example of a precision reply signal in response to a precision interrogation;

FIG. 2c illustrates the effect of the precision reply signal of FIG. 2b on the receiver of a conventional interrogator;

FIGS. 3a –3c illustrate a second example of a precision interrogation signal according to a phase modulation technique as compared to a conventional interrogation and its effect on a conventional transponder;

FIGS. 4a –4c illustrate a second example of a precision reply signal according to a phase modulation technique as compared with a conventional reply signal and its effect on a conventional airborne interrogator receiver;

FIG. 10 is a functional diagram illustrating in more detail the modulator of FIG. 7;

FIGS. 11a –11f illustrate various waveforms which appear at designated points in the diagram shown in FIG. 10;

Figure 21:
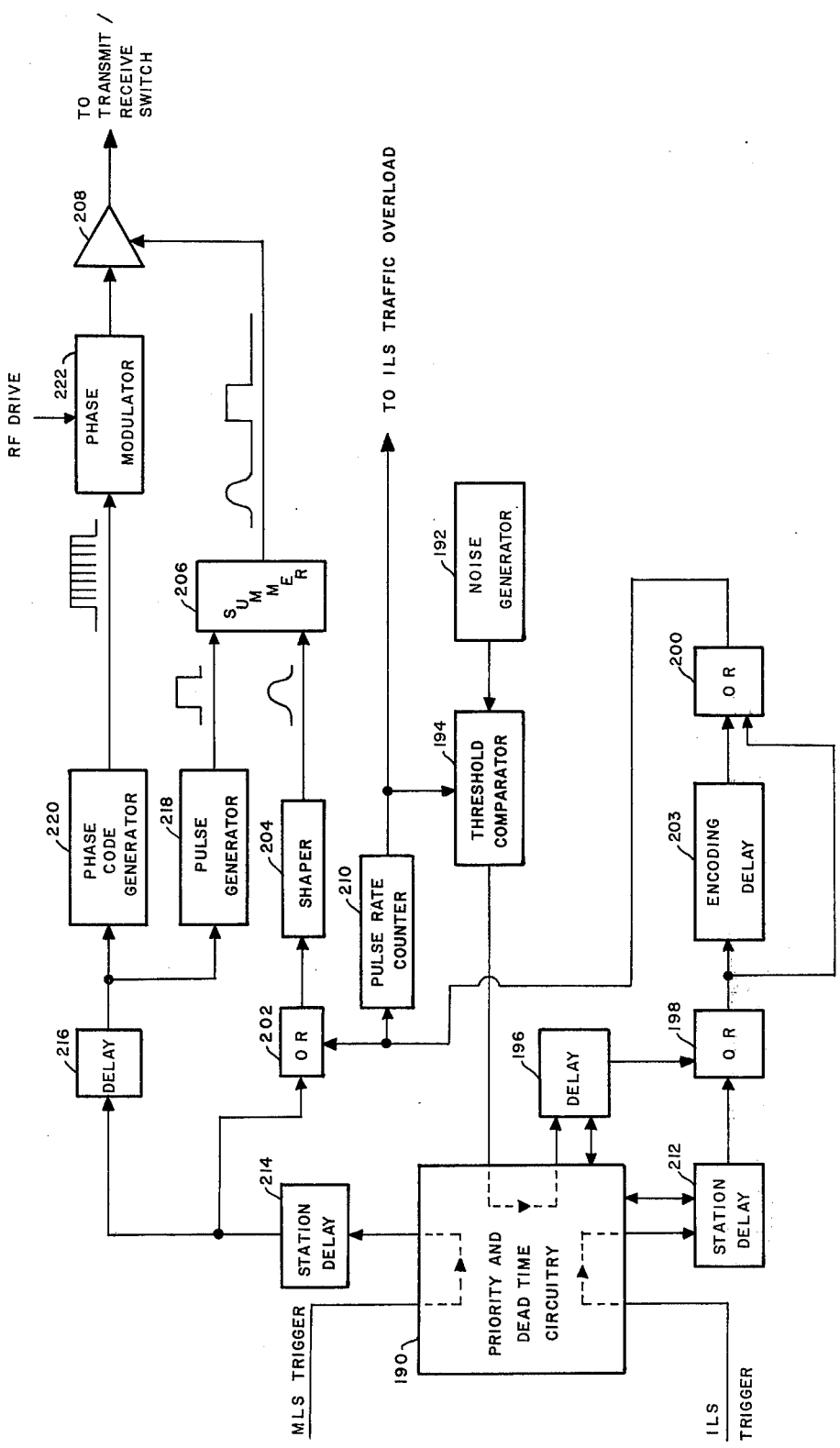
Figure 22:
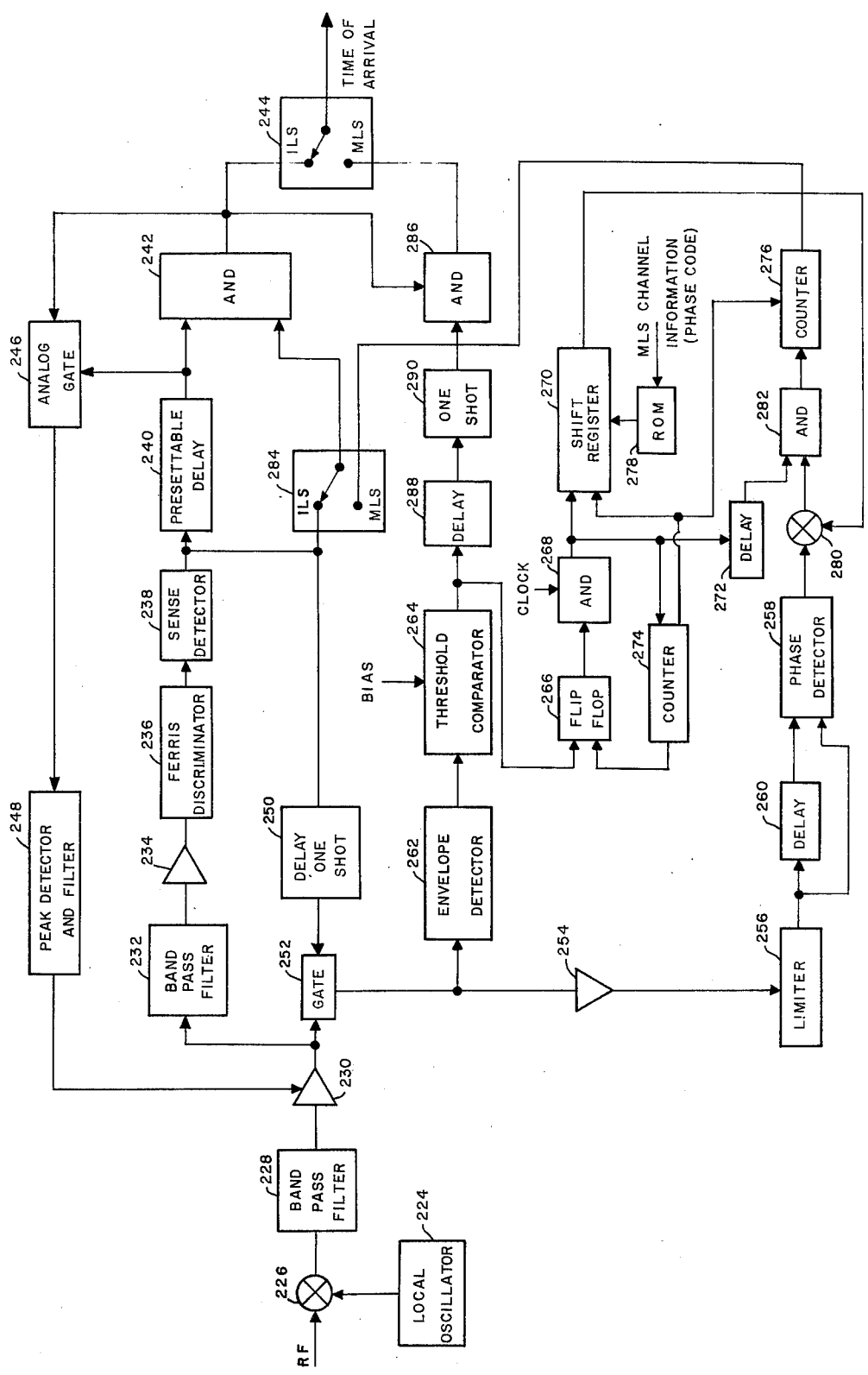

FIGS. 20a –j illustrate graphically preferred interrogation and reply signals according to the invention;

FIG. 21 is a block diagram of the transmitting portion of a combination MLS/ILS beacon; and FIG. 22 is a block diagram of a portion of an airborne ILS/MLS receiver.

DESCRIPTION OF THE PREFERRED EMBODIMENT

The present Gaussian pulses on L-Band have a spectrum which is down 60DB, 800 KHz away. If the rise time is decreased from 2.5 to 0.1 microseconds in order to provide C-Band accuracy, it can be expected that the spectrum would be down 60DB, 20 MHz away. One might question how this can be tolerated since L-Band channels are only 1 MHz apart. First, a Ferris discriminator has been an integral part of Tacan and DME for 25 years. Simply stated, it allows use of a neighboring channel at a time when it is not being used. This is accomplished by responding only to the center of a pulse spectrum, not to a spectrum which is off center. Admittedly, the duty cycle of both wanted and unwanted signals must be low. However, this is exactly the case in distance measuring equipment. Second, an L-Band landing system would require approximately 50 watts of power as compared to one kilowatt or more used for enroute DME. For example, using isotropic antennas, 50 watts at L-Band, have the same range as 1.2 kilowatt at C-Band. Third, MLS associated DME transponders, having an optional horizontal directivity, can result in either a reduced interference area or lower power. Fourth, by the assignment of a unique phase code to each DME channel regardless of its frequency, a reduced number of frequency channels, for example 20, would be sufficient to provide 200 or more DME channels. Fifth, single phase coded pulses for MLS-DME may be employed as opposed to paired pulses currently used for enroute and ILS L-Band DME. In this way, existing transponders designed to decode only paired pulses will not be affected by MLS type interrogators. The present system, therefore, continues to operate as it always has, with no modifications whatsoever.

FIG. 1a illustrates the conventional ICAO interrogations and FIG. 2a illustrates a conventional reply used on the so-called X-channels. The Gaussian pulses for both interrogations and replies are spaced 12 microseconds apart. For the Y channels, interrogation pulses are spaced 36 microseconds apart and reply pulses 30 microseconds apart. All other pulse spacings shown in FIG. 1a –c, 2a–c, 3a–c and 4a–c would be correspondingly increased by 24 and microseconds respectively for Y-channel operation.

FIG. 1b illustrates a new precision interrogation, and FIG. 2b a precision reply according to one embodiment of the invention. Interrogation pulses, each having a duration of 0.5 microseconds and a rise time of 0.1 microseconds, are generated at the leading edge of the first Gaussian interrogation pulse and the trailing edge of the second Gaussian interrogation pulse. Thus, the precision interrogation pulses are spaced 16 microseconds apart. The reply pulses have the same rise time (0.1 microseconds) but are of longer duration and are spaced 12 microseconds apart.

FIG. 1c illustrates the signal that is received by a conventional transponder corresponding to the precision interrogation of FIG. 1b, and FIG. 2c illustrates the signal received by a conventional interrogator corresponding to the precision reply of FIG. 2b. The pulses received in a conventional transponder have become stretched but remain 16 microseconds apart. Therefore, they are not decoded and la not result in the generation of a reply signal. However, the precision reply signal, while stretched by a conventional interrogator, is still spaced 12 microseconds apart and is therefore decoded. Thus, the precision interrogation does not affect a conventional transponder, but a precision reply is decoded by a conventional interrogator. It should be clear that the accuracy of a system employing waveforms shown in FIGS. 1b, 1c, 2b and 2c will have an accuracy substantially greater than that of a system employing the standard Gaussian pulses shown in FIGS. 1a and 2a. It should be noted that in order to generate an interrogation of the type shown in FIG. 1b from a conventional 12 microsecond pulse pair interrogations, it is necessary to clip the existing interrogation pulses. However, the precision service is only needed at short ranges (below 30 miles) for which 50 watts of power is adequate compared with one kilowatt power required when using normal enroute pulses such as those shown in FIG. 1a and FIG. 2a.

While the above described waveforms produce no appreciable interference to the existing system, it is necessary that each transponder responds to a different one of the above mentioned 200 frequency channels. If a lesser number of channels (for example, 20) are allocated to DME, it would be desirable to provide a coding arrangement for channeling purposes. Carried to the extreme, given a sufficient number of codes, 200 or more DME channels may be provided on any existing frequency channel entirely independently of other sites.

The new L-Band DME can be used with either a system which empolys rigid channel pairing plans or one in which channel plans are quite flexible. By rigid channel plans, it is meant that several facilities, such as glide slope, localizer, VOR and DME, always have a fixed frequency channel relationship, whereby a single channel selector in the cockpit of an aircraft automatically selects the proper combination. This method has the advantage that if one of the facilities is not implemented at a particular site, its frequency assignment is, in effect, wasted. Consequently, frequency planners favor flexible frequency channeling plans. As an indication that the proposed scheme can be used with either system, the following three examples are offered: First, 200 MILS angle channels can be rigidly paired with 200 VHF navigation channels and a common control box provided. Forty of these channels can then be used with co-located ILS and MLS. Secondly, a group of navigation channels, for example, the 20Y channels, can be split among 200 MLS angle channels, each navigation channel providing 256 phase codes for MLS type DME. Third, a completely random pairing arrangement can be employed whereby any angle channel is paired with any DME channel. Clearly, a large number of DME frequencies is to be preferred over a few. However, the key point is that there exists the capability of providing a total of 32,256 (126 × 256) MLS type DME channels, of which only 200 have to be used.

FIGS. 3a –c and 4a –c illustrate the relationship between standard interrogation and reply pulses currently used in conventional DME (FIGS. 3a and 4a) and one example of a phase-coded precision interrogation and reply signal (FIGS. 3b and 4b). The phase coded interrogation signals shown in FIG. 3b is shown as a single pulse broken up into short chips, in the order of 0.5 microseconds, during which the RF phase has a recognizable value. Naturally, the more chips provided, and the more phase variation used, the greater the number of possible codes. For the sake of simplicity, we will reserve discussion to 8 chips and 2 phases from which it is possible to generate 256 possible phase codes for each of the conventional DME frequencies. Practically speaking, however, many of the 256 codes are undesirable, and it is therefore likely that perhaps 11 chips, capable of generating 2,048 phase codes, would be more practical. The general plan is the same and there is ample room within the standard Gaussian pulses shown in FIGS. 3a and 4a. The use of a larger number of chips would further decrease interference to the existing DME system. For instance, if all possible codes of an 8 chip system were employed, one code would necessarily consist of all chips having a first phase, and one other code would consist of all chips having a second phase. Assuming a two-phase system, it could be said for the sake of clarity that one phase code would therefore consist of all plus chips, while another code consists of all minus chips. Nevertheless, each code would look like a single flat pulse to a conventional receiver. Phase coding could still further reduce interference by always maintaining about the same number of plus and minus chips in a particular code and by keeping the number of consecutive plus bits or minus chips very low.

FIGS. 3c and 4c illustrate how conventional equipments would receive the precision interrogation pulse and reply pulses shown in FIGS. 3b and 4b. The single interrogation pulse produces a variable response in the transponder receiver depending on the exact nature of the code. However, since there is no second pulse at all, no decoding occurs in a conventional transponder and therefore, no reply pulse is generated. It should be noted that either the first or second of the conventional interrogation pulses may be suppressed.

The reply codes shown in FIG. 4b are deliberately arranged so that they add up to recognizable pulses in a conventional interrogator receiver (FIG. 4c).

It is also possible to use interrogations of the type shown in FIG. 3b and reply pulses of the type shown in FIG. 2b is such an arrangement is required by particular circumstances.

Figures 5, 6:
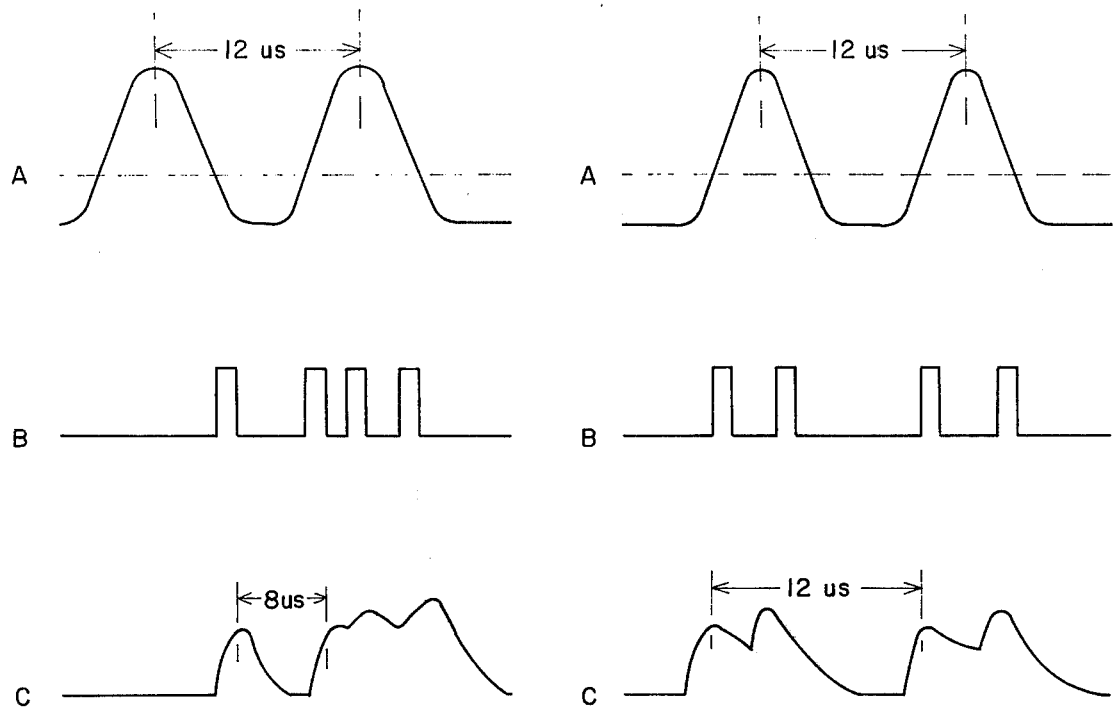
FIGS. 5a –5c illustrate a third example of a precision interrogation according to a pulse position coding technique.
FIGS. 6a –6c illustrate a third example of a precision reply signal according to a pulse position technique.

FIGS. 5a –5c and 6a –6c illustrate another form of precision coding which does not employ phase coding of the precision pulses. Here the precision interrogations shown in FIG. 5b and precision reply signal shown in FIG. 6b are pulse position coded, i.e., the presence or absence of a particular pulse at a particular time determines the code. While pulse position coding does not offer as many code combinations as does the phase coding approach for a given number of chips, it does allow the circuitry to be somewhat simplified. The pulse position approach would find its greatest application in situations where a large number of frequency channels are available, thereby reducing the need for a multiplicity of precision pulse codes on each channel.

Referring to FIG. 5c, it should be noted that by making use of the last precision chip of the first conventional interrogation pulse, a conventional transponder will receive pulses having leading edges spaced 8 microseconds apart and therefore, this interrogation will not be decoded by a conventional 12 microsecond decoder. The precision reply signal shown in FIG. 6b, however, is such that two pulses having leading edges spaced 12 microseconds apart will be received and decoded by a conventional interrogator receiver. Again, it should be stressed that any of the above described interrogation methods may be used with any of the above described reply methods depending on circumstances that may be unique to a particular environment.

Figure 7:
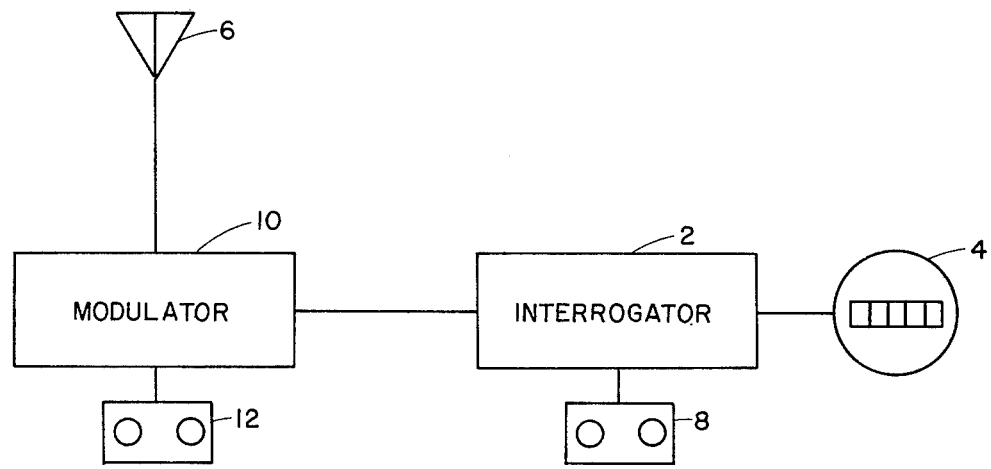
FIG. 7 is a block diagram of a conventional DME airborne interrogator system having a modulator for providing precision coding inserted between the interrogation and antenna.

Referring to FIG. 7, there is shown a DME interrogator 2 having associated therewith a distance display 4, an L-Band antenna 6, and a navigation channel selector 8 which is used additionally for VOR and ILS channel selection. Interrogator 2, display 4, antenna 6 and channel selector 8 represent a standard L-Band DME interrogator apparatus currently used. If modulator 10 were taken out of the system, antenna 6 would radiate standard pulse pair interrogations on a specified channel for triggering reply pulses from a ground beacon which, in turn, would be received by antenna 6 and the distance between both points computed. The ground beacon replies only to pulse pairs containing a specified and predetermined spacing.

In order to render the standard DME interrogator compatible with the new MLS system, a solid state modulator 10 is inserted between the airborne interrogator 2 and its antenna 6. Modulator 10 operates on the first and/or second pulse depending on whether phase coding or pulse position coding is to be employed, and other systems considerations. During normal use, this modulator remains inactive. For MLS, however, the modulator is keyed with an N chip code controlled by an MLS DME channel selector 12. If, for example, an 8 chip code were used, 256 phase codes on every L-Band frequency to which the interrogator is set could be generated. The 256 phase codes are enough to handle the 252 Tacan channels, of which 200 are common to the ICAO system.

Replies from the interrogated transponder are within the pulses of the standard L-Band pulse pairs. These pulse pairs are received by antenna 6 and interrogator 2 in the normal way, decoded, and the ranging circuit is activated to provide distance measurement.

Figure 8:
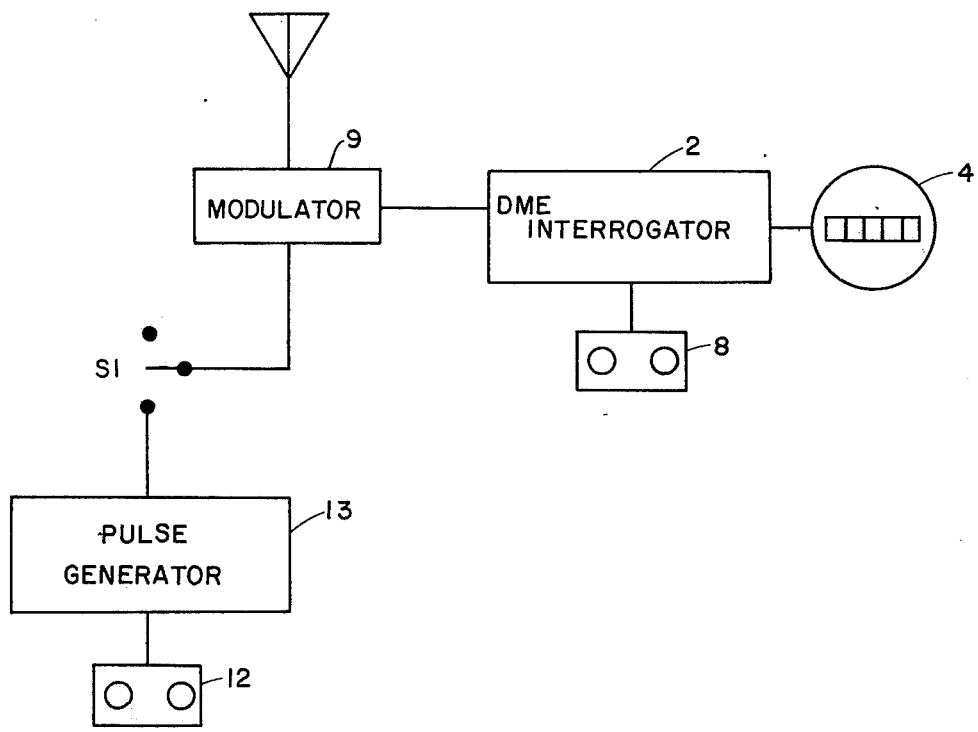
FIG. 8 is a block diagram illustrating the modulator of FIG. 7 in somewhat more detail.

FIG. 8 illustrates modulator 10 in more detail. Channel selector 12 controls a pulse code generator 13 which, when operating in the MLS mode as indicated by switch S1, controls a modulator 9. Modulator 9 clips the normal pulses from 1 kilowatt to 50 watts (to 0 watts when suppressing either the first pulse or second pulse of the standard interrogation) and responds to timing signals from the precision DME pulse code generator 13. In the case of the embodiment shown in FIG. 1b, these pulses are paired 16 microseconds apart; for the embodiment of FIG. 3b the pulse code generator, in combination with the pin diode modulator, provides phase shifted chips having a duration in the order of 0.5 microseconds. All other operations remain unchanged.

Figure 9:
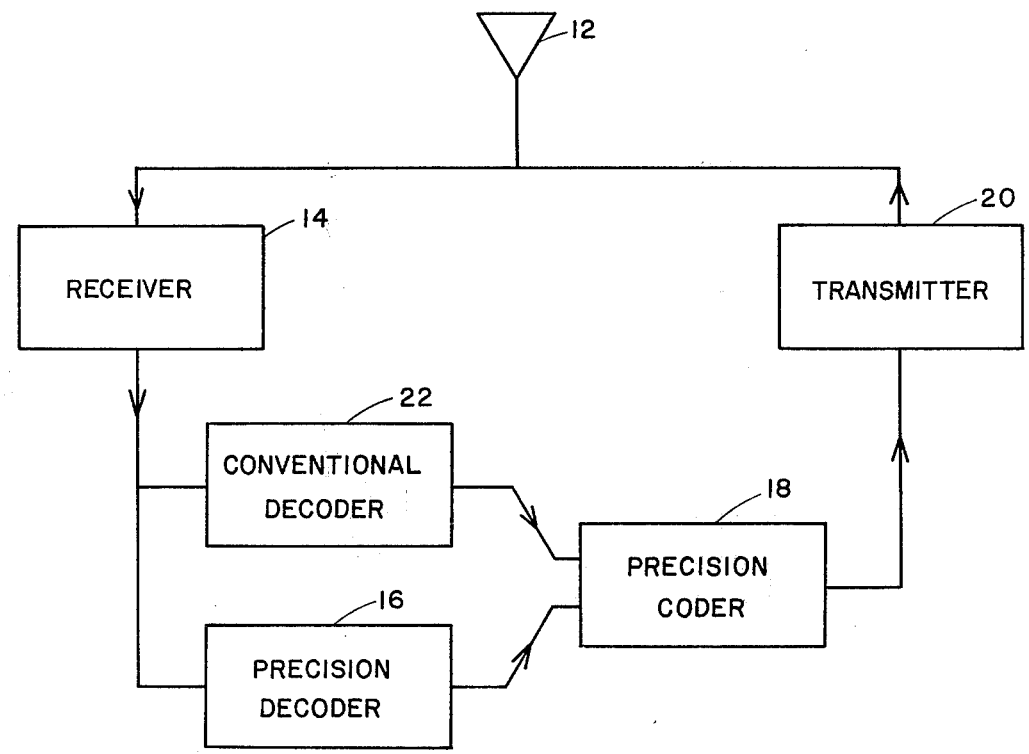
FIG. 9 is a block diagram of a new transponder capable of receiving both conventional and precision interrogation signals.

In order to provide a DME transponder that is compatible with both MLS and ILS, a new transponder must be provided so that when MLS code interrogations are received, the transponder replies with a signal of the type shown in FIGS. 2b or 4b or 6b. As stated previously, each of these reply signals will be received and decoded by a conventional interrogator receiver. Referring to FIG. 9, the receipt of an MLS interrogation by antenna 12 and receiver 14 causes a precision reply signal to be generated and transmitted via precision decoder 16, precision code generator 18 and transmitter 20. If a conventional interrogation is received, it is decoded in a conventional decoder 22; however, again a precision reply is transmitted via precision code generator 18 and transmitter 20. As stated previously, the precision replies are designed in such a manner that they will be detected and decoded by a conventional interrogator receiver.

Any interrogators which may eventually replace all existing interrogators and which are intended to provide a high degree of accuracy will, of course, make use of pilot pulses and contain means for decoding the phase coded pulses.

FIG. 10 illustrates a circuit which may be inserted in the antenna lead between a conventional interrogator 2 and antenna 6 for providing precision coded interrogations. Certain waveforms appearing within the circuit of FIG. 10 (denoted by large case letters) are shown in FIGS. 11a – 11f. The conventional interrogation pulses supplied by interrogator 2 and shown in FIG. 11a are clipped by diode D1 and differentiated by the parallel resistive-inductive combination R1 and L1. This results in the generation of start pulses at point B of the circuit as shown in FIG. 11b. The trigger pulses trigger a one-shot multivibrator 26 whose output has a period which exceeds the duration of the conventional pulse paired interrogations. The output of multivibrator 26 is shown in FIG. 11c. During this time, a 2 MHz clock 27 is energized (FIG. 11d). The leading edge of the output of multivibrator 26 also energizes delay line 28 after differentiation by capacitor C1 and resistor R2. Delay line 28 contains a series of taps which are connected via code selecting switch 30 to isolating diodes 32. The common output of diodes 32 is then applied to a gate 40 which also receives the output of clock 27. The common output of diodes 32 after code selection is shown in FIG. 11e. This arrangement insures that the precision pulses are tuned to the clock signal.

After amplification in amplifier 34, the coded pulses are applied to pin diode D2, the output of which modulates the outgoing RF energy, i.e., interrogation pulses.

Between the interrogator 2 and its antenna 6, there is arranged a circulator 36 which passes received signals (replies) without impairment. However, circulator 36 contains a tap on the outgoing line which is connected to pin diode D2 by a half wavelength line (slightly foreshortened to necessitate for diode capacity) so that when the diode is conducting, it reflects a short across the tap. Depending on whether diode D2 is or is not conducting, as controlled by the influence of amplifier 34, outgoing RF pulses are either transmitted or not transmitted. The signal which is applied by amplifier 34 to diode D2 is shown in FIG. 11f.

Figure 12:
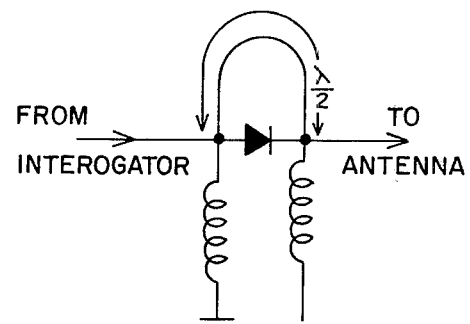
FIG. 12 shows an alternative arrangement to the circulator in FIG. 10 when a phase modulation technique is being employed.

FIG. 12 illustrates an alternative arrangement to be used in place of circulator 36 when phase modulation is desired. In this case, when diode D2 is conducting, there is no phase shift. When it is open, however, a half wave line is inserted into the RF path generating an 180° phase shift (or such other value as may be desired).

Figure 13:
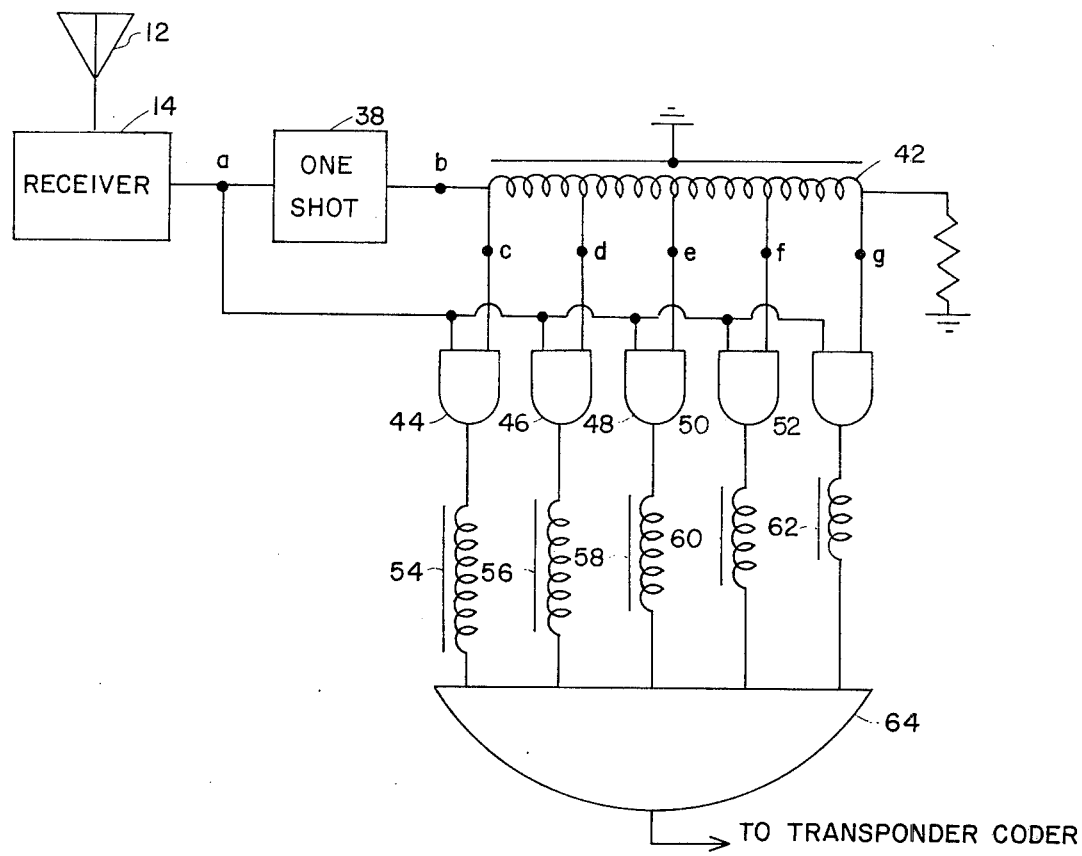
FIG. 13 is a functional diagram of a decoder for decoding precision interrogations and replies.
Figure 14:
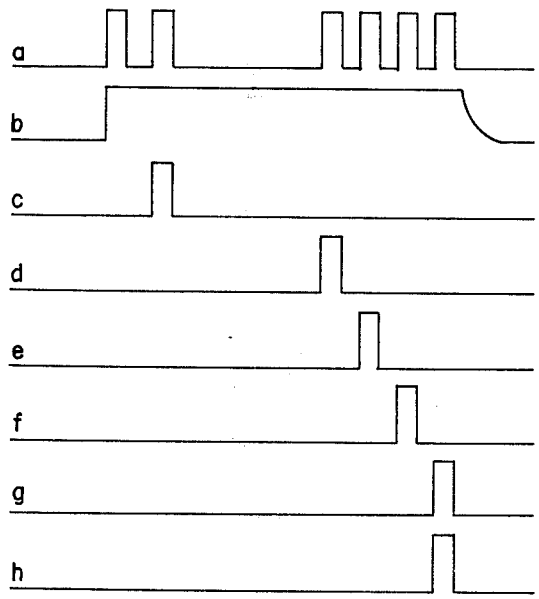
FIGS. 14a –14h illustrate signals appearing at designated points in the diagram of FIG. 13.

FIG. 13 shows an arrangement whereby precision interrogations may be decoded. After receipt of a precision interrogation via antenna 12 and receiver 14 (such as that shown in FIG. 14a), the first pulse triggers a one-shot multivibrator 38. The leading edge of the output of multivibrator 38 is applied to tapped delay line 42, which taps are arranged to detect a desired pulse code. FIG. 14b illustrates the output of multivibrator 38 and FIGS. 14c–14g illustrate the signals as detected on lines coupled to the delay line taps. Gates 44, 46, 48, 50 and 52 detect coincidence of the received pulse train (FIG. 14a) with the delayed first pulse of the pulse train and after appropriate delays in delay lines 54, 56, 58, 60 and 62, are summed in summer 64, the output of which (shown in FIG. 14h) is fed to the transponder coder circuits.

Figure 15:
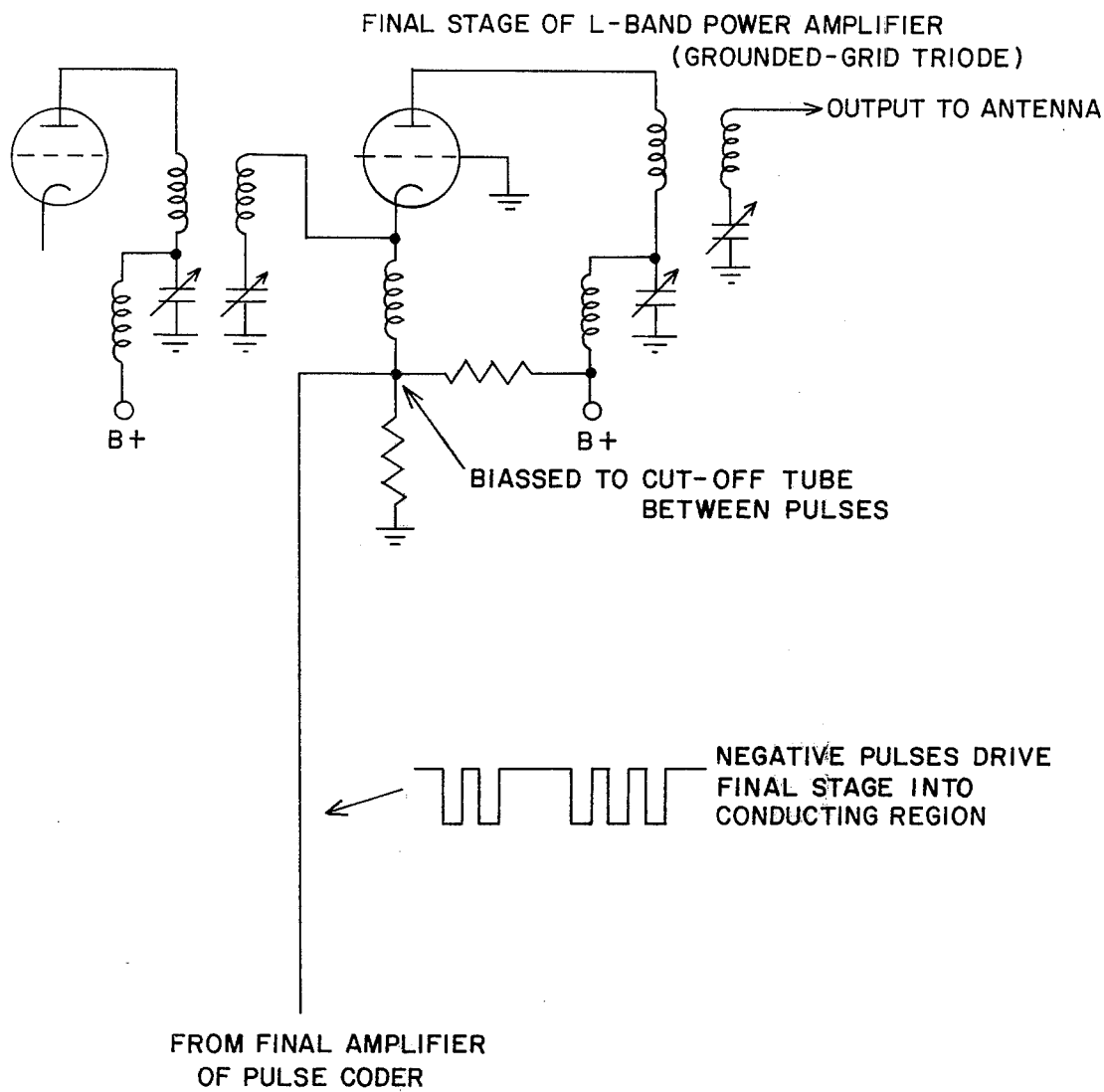
FIG. 15 is a schematic diagram of the final stage of an L-Band power amplifier capable of generating precision interrogations and replies according to the invention.

FIG. 15 shows a final stage of an L-band power amplifier (grounded-grid triode) applicable to new MLS interrogators and transponders. A series of negative pulses drive the final stage, which is biased to cut off between pulses, into the conducting region.

Present day DME (referred to as NAV/ILS) operates in the 960–1215 (L-Band) frequency range. As stated previously, the airborne sets interrogate a ground beacon with a pair of Gaussian spaced pulses spaced 12 microseconds (X mode) or 36 microseconds (Y mode). The ground station replies with Gaussian shaped pulse pairs of 12 microseconds (X mode) or 30 microseconds (Y mode). The pulse rise times of the order of 2 microseconds are too slow to attain the accuracies required to Microwave Landing System (MLS). The embodiments thereof are described herein, for implementation of an L-Band DME with MLS accuracy, that can share the L-Band with NAV-/ILS DME, without mutual interference.

To accomplish MLS accuracy, a new ground beacon will be required. It may also have the capability of providing NAV/ILS service.

Some aircraft operators may wish to avail themselves of the service provided by new MLS beacons, but will be satisfied with NAV/ILS accuracy. For these people, an MLS adapter unit, used in conjunction with their present ILS/NAV DME, will provide this service at low cost.

Figure 16:
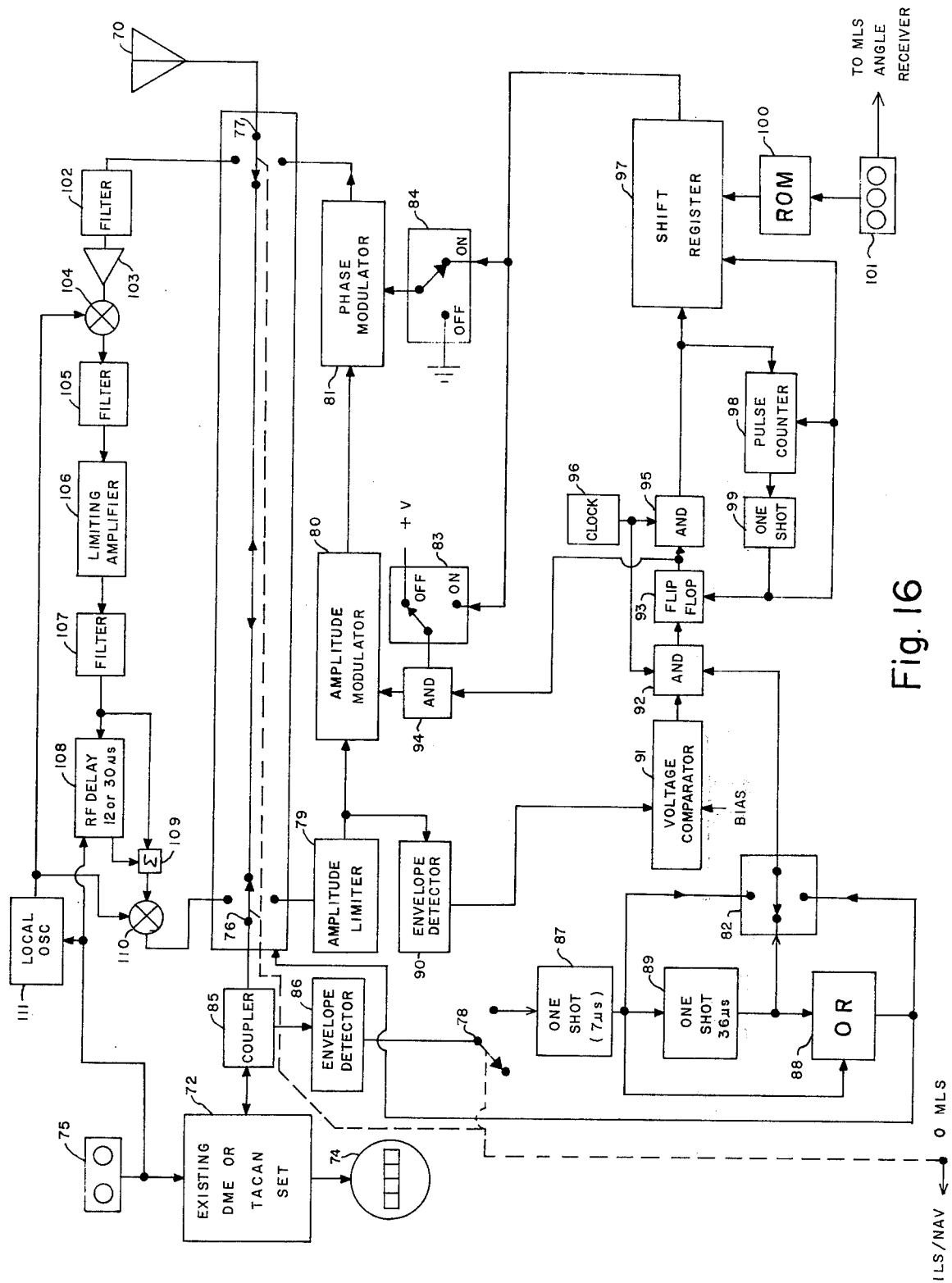
FIG. 16 is a block diagram of an inventive MLS adapter.

FIG. 16 is the block diagram of an MLS adapter box designed for insertion between the antenna 70 and the DME set 72, its distance display 74, and channel selector 75. The latter is usually incorporated as part of the NAV/COM/ILS control box. For conventional NAV-/ILS operation, switches 76, 77, and 78 are in the positions shown, and the signals pass through the MLS adapter without modification. Switches 76, 77, and 78 are locked into this position by ILS/NAV/MLS switch 300. For MLS operation, a variety of transmitted signal structures can be implemented with the embodiment shown. This arrangement functions as follows:

A "flat top" pulse several microseconds width is derived by amplitude limiting the DME output pulse with amplitude limiter 79. On-off modulation, and thus control of the transmitted pulse rise and fall times, and on-off modulation within the pulse is provided by amplitude modulator 80. Phase modulation within the pulse is provided by phase modulator 81. This modulator and its control circuitry is shown biphase but may be polyphase. The position of switch 82 determines whether the transmitted pulse is derived from the first or second, or both pulses from the DME. The position of switch 83 determines whether or not the pulse contains internal amplitude modulation, and the position of switch 84 determines whether or not the transmitted pulse is phase modulated.

The preferred output pulse is a pulse of 3.33 microseconds flat top duration, of 10 chips, four phase modulated, and rise time of 0.1 microseconds.

Deriving the transmitted pulse from the second DME pulse results in a simpler overall system, and will be assumed. Switch 82 will be in the position shown.

When switch 300 is placed in the MLS position prior to an MLS transmission, switches 76 and 77 will be in the upper (receive) position. Upon transmission, a portion of the first DME pulse passes through coupler 85 to envelope detector 86, whose output pulse passes through switch 78 and triggers one shot 87. Its output drives OR gate 88, and its trailing edge triggers one shot 89, which also drives OR gate 88. Thus the output of OR gate 88 is a pulse of 43 microseconds duration. It is applied to switches 76 and 77 and holds them in the down (MLS transmit) position during the duration of both DME pulses, thus applying them to limiter 79. The output of this limiter drives envelope detector 90, which drives voltage comparator 91. Its bias is set so that it changes state to a logic 1 when the limiter output is nearing maximum. Thus it will change state on both the leading edge of the first and the second pulses. The output of one shot 89 does not become a 1 until after the end of the first pulse. Thus the three inputs of AND gate 92 (and thus its output) do not become a 1 until the first clock pulse occurs after the leading edge of the second DME pulse arrives. When this occurs, Flip Flop 93 is set. This turns AND gates 94 and 95 on. Turning the former on turns amplitude modulator 80 on, and it remains on until Flip Flop 93 is reset.

The circuit constants of modulator 80 are such that its output rise time is (for the preferred circuit being described) about 0.1 microsecond. As no amplitude modulation within the pulse is desired in this case, switch 83 is in the position shown.

When AND gate 85 was turned on, it allowed pulses at a 3.33 MHz rate from clock 96 to drive shift register 97 and pulse counter 98. Pulse counter 98 counts up to ten, and then outputs a pulse which triggers one shot 99. This resets Flip Flop 93, turning AND gate 95 off, resets the counter to zero, and strobes the contents of read only memory 100 into the shift register. During the time the counter was counting, the shift register contents were shifted out via switch 84 to phase modulator 81 which phase modulates the pulse.

The phase modulator shown provides biphase modulation. The preferred signal structure utilizes four phase modulation. This is easily implemented by cascading two ± 45° modulators, with separate digital drive for each of two independent shift registers.

The phase code for a particular channel is generated by ROM 100, in accordance with commands from MLS channel selector 101, which also controls the MLS angle receiver.

Forty-three microseconds after the leading edge of the first DME pulse, the output of OR gate 88 becomes a zero, which returns switches 76 and 77 to their MLS receive (upper) position.

One of the aims of this system is to be able to operate MLS and NAV/ILS beacons on the same radio frequency, in the same geographical area, without interference. As existing DME sets will respond only to a particular pulse code, and having Automatic Gain Control (AGC) that allows them to respond only to the strongest on channel signal, the reply signal from an MLS beacon must differ from the reply signal from NAV/ILS; otherwise existing DME sets will "hear" only the strongest of the two signals, and there is no way of guaranteeing that the strongest signal will be the desired signal. Therefore, the MLS adapter box must convert the MLS reply signal to a signal that will be accepted by the DME set.

One way of accomplishing this is shown in the upper part of FIG. 16. All incoming signals pass through filter 102, amplifier 103 to mixer 104. Its difference (intermediate) frequency output is selected by filter 105, which has a bandwidth of approximately 4MHz. Its output drives hard limiting amplifier 106 which drives filter 107. It has a bandwidth of about 400 KHz. With this arrangement, any on channel pulse (non-phased coded) of several microseconds duration will emerge from filter 107 with a constant amplitude, providing its energy content is more than 10 db greater than the noise density. The pulse peak power will be about 10 times the noise power at the output of filter 107. Thus the pulses at the output of filter 107 are independent of their amplitude as received at the antenna.

The preferred MLS beacon reply waveform is a standard Gaussian pulse, followed by a phase coded pulse.

Because of its spread spectrum characteristics, the phase coded pulse will not emerge from filter 107 appreciably above the noise; thus it is ignored in this system. To convert the single Gaussian pulse received as a reply from an MLS beacon to a pulse pair, the output of filter 107 is applied to RF delay device 108, preferably a surface acoustic wave device, which provides 12 or 30 microseconds delay, and unity gain. The output of the rf delay is summed with its input in summer 109, and applied to mixer 110, whose output drives standard DME set 72. One of the outputs of mixer 109 is the same frequency as the incoming on channel signal, thus it will be accepted and processed by the DME set.

If the IF of the MLS adapter is 63 MHz, then the frequency of local oscillator 111 is the same as the transmit frequency of the DME set. Thus, this local oscillator signal can be generated within the MLS adapter, and controlled from control box 75, or extracted from the DME Set.

The adapter receiving circuitry just described converts each incoming, on channel Gaussian pulse into a pair of pulses spaced 12 or 30 microseconds, of constant amplitude. These pairs are appropriate inputs to a standard DME set.

This implementation increases the "fruit" that the DME set ranging circuits must contend with because each received pulse becomes a pair, and NAV/ILS DME pulses are also accepted. In addition, addition countdown will occur due to "hole punching" by strong adjacent channel signals.

Figure 17:
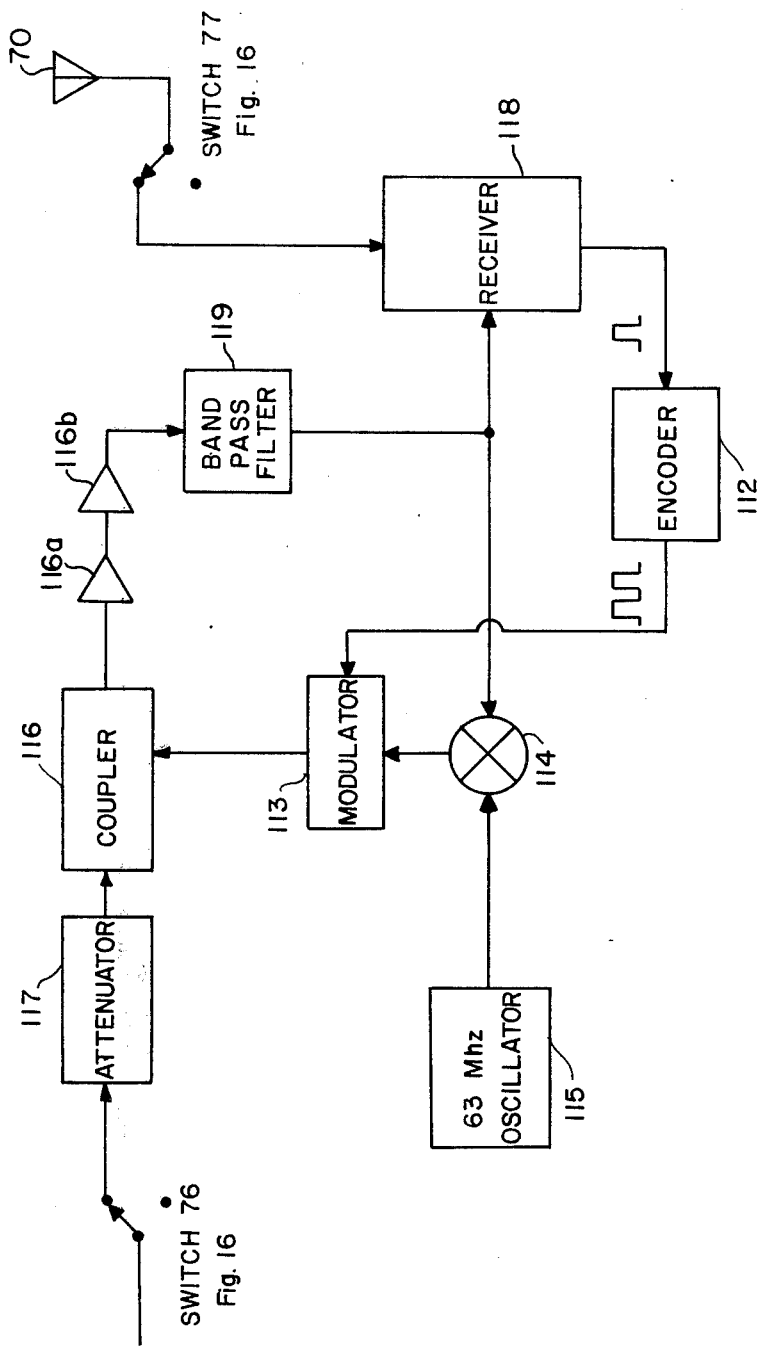
FIG. 17 is a block diagram of a receiving arrangement for the adapter of FIG. 16.

A receiving scheme for the adapter providing improved performance, is shown in FIG. 17. Here a receiver 118 (one specifically designed to receive MLS beacon signals only), is used to generate a Time-of-Arrival pulse. It drives encoder 112 which generates an X mode or Y mode pulse pair. This pulse pair drives Off-On modulator 113. The input to mixer 114 is the output of filter 119, and a 63 MHz obtained from oscillator 115. Thus the output of mixer 114 contains a signal at the DME receiver frequency, which is coupled into the receiver 118 via directional coupler 116 amplifiers 116a and 116b, band pass filter 118 and attenuator 117.

This particular arrangement is dependent on the existence of a small amount of DME receiver, local oscillator leakage appearing at the DME receiver terminals. If sufficient leakage does not exist, the local oscillator can be extracted directly from the DME set, or generated within the MLS adapter.

Figure 18:
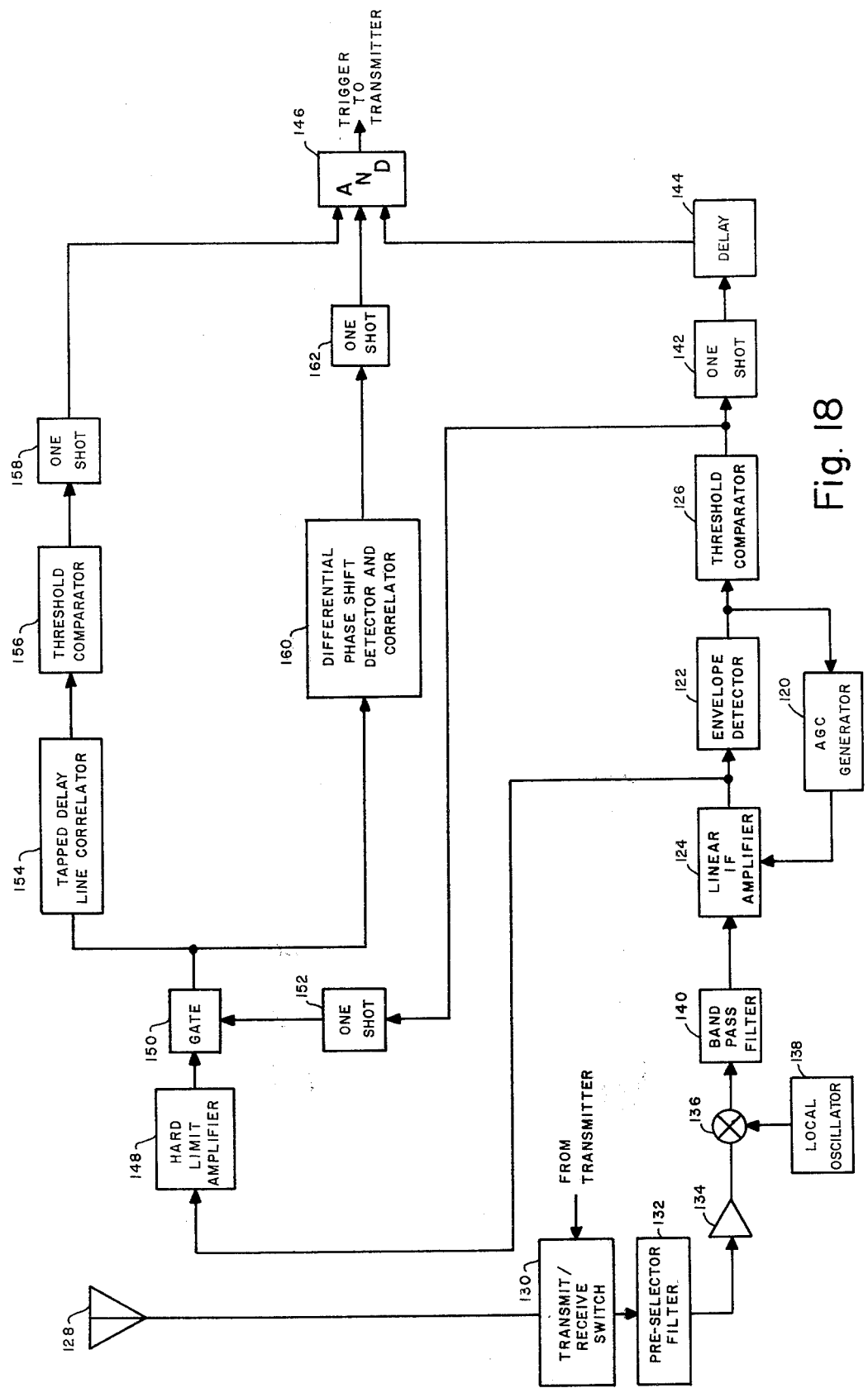
FIG. 18 is a block diagram of one embodiment of an arrangement for receiving and processing phase coded interrogations originating from a conventional DME interrogator set equipped with the above described adapter.

FIG. 18 shows one embodiment of an arrangement for receiving and processing phase coded interrogations originating from a conventional DME interrogator set equipped with the above described adapter. The receiving system shown in FIG. 18 will also respond to interrogations from new interrogators designed specifically for MLS as will be described hereinbelow.

For the sake of clarity, it will be assumed initially that the interrogation is a single bi-phase coded pulse having a rise time of approximately 0.1 microseconds and a length T comprising ten equal length chips having a time duration of 0.333 microseconds. The carrier frequency may be anyone of the 126 airborne DME frequencies. Referring to FIG. 18, automatic gain control (AGC) generator 120 receives the output of envelope detector 122 and generates a voltage which controls the gain of linear IF amplifier 124. The AGC circuit constants are such that continuous waves (CW) will not produce sufficient voltage to exceed the threshold comparator 126. Receiver and external Gaussian noise will rarely exceed this threshold.

Incoming pulses received by antenna 128 pass through transmit/receive network 130, preselector filter 132 and amplifier 134 to mixer 136. The output of a local oscillator 138 is also applied to mixer 136, which mixer produces a difference frequency output which is applied through band-pass filter 140 to IF amplifier 124. Band-pass filter 140 contains the bulk of the pre-correlator receiver selectivity. The bandwidth of filter 140 is in the order of 10 MHz so as not to significantly degrade pulse rise time.

All pulses above the noise peaks pass through filter 140, are detected in envelope detector 122 and trigger threshold comparator 126, which in turn triggers a fast rise time, short duration one-shot multivibrator 142. The leading edge of the output of one-shot 142

"marks" the time of arrival of the incoming pulse. This output is delayed for approximately five microseconds by a delay circuit 144 having an output which is coupled to an input of AND-gate 146. The output of AND-gate 146 triggers a reply by the transmitter portion of the beacon if the output of the one-shot is gated through (validated) by the other inputs to AND-gate 146.

Validation occurs as follows: the output of linear amplifier 124 also drives a hard limiting IF amplifier 148 having a constant power output for driving analog gate 150. The output of one-shot 152 also forms an input to gate 150. One-shot 152 is triggered by threshold comparator 126 coincidentally with the triggering of one-shot 142. The output of one-shot 152 has a time duration slightly greater than 3.33 microseconds. This is slightly greater than the length of a bona fide interrogation. In this way, all of the interrogation pulse passes into a tapped delay line correlator 154. If the received pulse is recognized by correlator 154, and is on the correct radio frequency channel, a strong correlation output pulse is produced which exceeds the threshold of threshold comparator 156. The output of threshold comparator 156 triggers a third one-shot 158. The output of one-shot 158 produces a pulse which is applied to an input of AND-gate 146, which pulse brackets the timing pulse from delay 144. The amplitude of the correlating peak is very sensitive to frequency. Thus, the delay line correlator makes a distinction between on-channel radio frequencies and off-channel radio frequencies.

The output of gate 150 is also applied to a differential phase shift detector 160 which sequentially compares the phase of each chip with the phase of the preceding chip. If the output correlates with the phase code for the beacon a one-shot 162 will be triggered generating a pulse which is applied to a further input of AND-gate 146, which pulse brackets the timing phase from delay circuit 144. As phase shift detector 160 compares the phase with respect to the phase which existed ⅓ microsecond previously, no loss in correlation is envisioned due to variations in the premodulation phase of the pulse from the airborne interrogator. Thus, to be decoded, the incoming pulse must be on the proper frequency (as sensed by correlator 154) and must have the proper phase code (as sensed by phase detector 160).

Since we have assumed 10 chips, the number of possible phase codes equals $2^9$ or 512 phase codes. However, as stated previously, many of these codes are not useful. Probably the most useless in the one consisting of 10 chips of the same phase (a CW pulse). The most desirable codes are those in which the number of chips having a first phase and the number of chips having the second phase is approximately equal and wherein the number of successive chips having the same phase is small. In any event, if a computer analysis shows that 200 "good" codes cannot be obtained from a family of 512 possible codes, several options are available. The first is to simply increase the number of chips. This results in either a longer pulse or shorter chip. A preferred option would be to use quadriphase modulation in the interrogator. This provides $4^9$ or 262,144 DPSK phase codes for a 10 chip pulse. Obviously, 200 very good codes can be selected from this large family. Further, very little additional hardware is required in the interrogator for quadriphase modulation.

The tapped delay line correlator 154 can be configured to process quadriphase signals. The amount of unintentional phase modulation in the interrogator is one-half of that permitted in the case of bi-phase modulation. Tapped delay line correlator 154 may consist of a surface acoustic wave (SAW) device. Further, it would be of advantage that there be an integral number of pulses per chip. If the frequency were chosen to be the usual DME 63 MHz, there would be 21 cycles per chip for the assumed chip length of ⅓ microsecond. Further, fixed coded SAW devices are much cheaper and more reliable than programmable devices.

Figure 19:
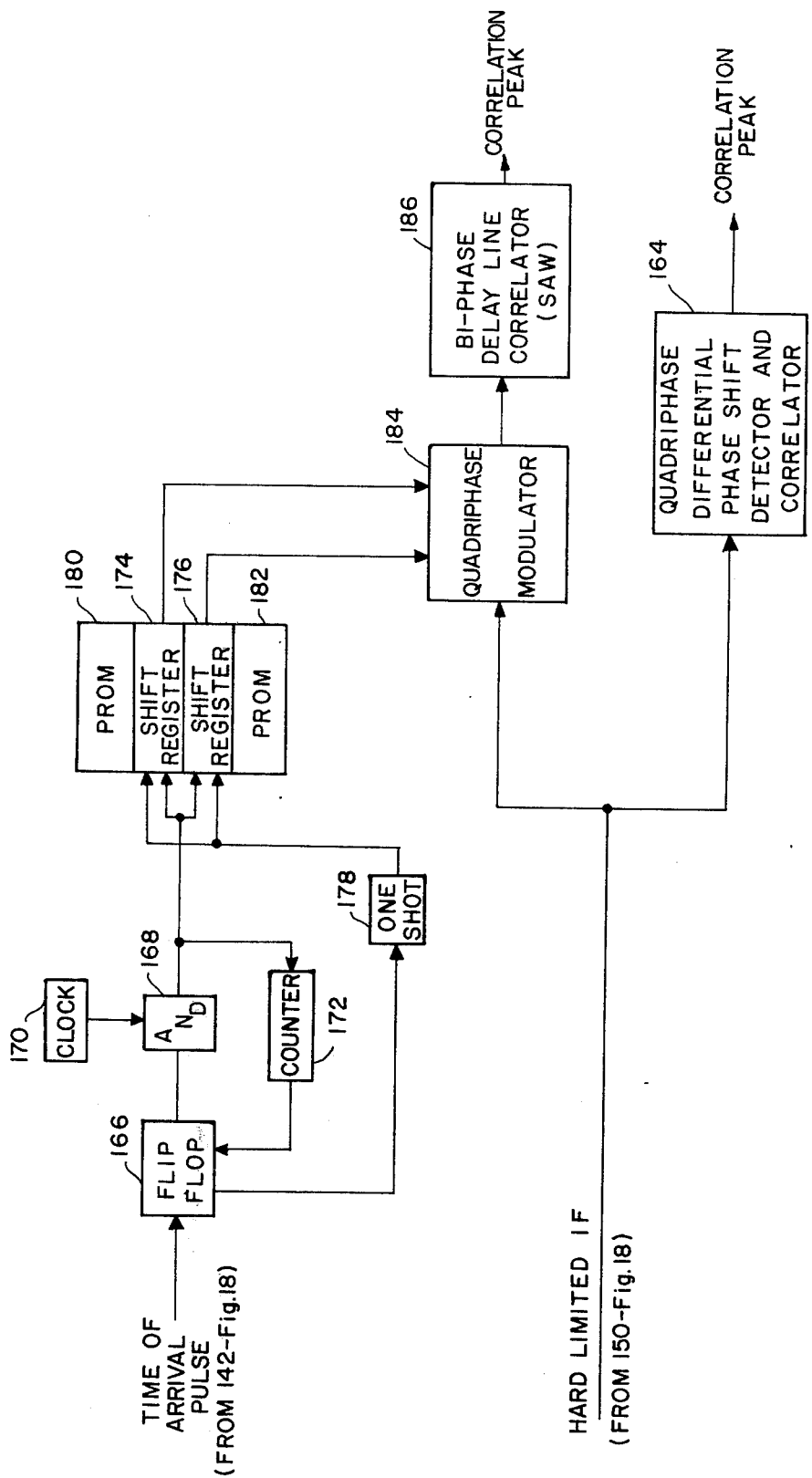
FIG. 19 is a block diagram of a quadriphase modulation arrangement for use with the adapter of FIG. 16.

A desirable arrangement is one in which there is one fixed SAW having a fixed code, in each and every transponder. An arrangement for doing this is shown in FIG. 19.

Hard limited IF energy having a quadriphase modulation imposed thereon is applied to differential phase shift detector and correlator 164 from gate 150 shown in FIG. 18. Phase detector 164 will provide a valid output pulse only if the correct phase code was received. The time of arrival pulse from one-shot 142 (FIG. 18) sets flip-flop 166, which enables AND-gate 168, thus allowing clock pulses from clock source 170 to pass through AND-gate 168 to a counter 172 and shift registers 174 and 176. Counter 172 counts pulses until it reaches a count of 10 (the number of chips). Counter 172 then resets flip-flop 166, thereby disabling AND-gate 168. This prevents the passage of further clock pulses. Counter 172 also triggers a one-shot 178 which in turn loads the contents of programmable read only memories (PROM) 180 and 182 in their associated shift registers 174 and 176 respectively. Thus, each incoming pulse will produce a train of 10 pulses which are applied to quadriphase modulator 184 in accordance with the information in the PROMS. The function of the quadriphase modulator is to convert the incoming phase code to the bi-phase code of SAW 186 which generates a correlation peak when driven by the proper code. In this way, the same SAW code can be used for all beacons with unique programming of the PROMS for each MLS channel. Clearly, the possibility for growth exists. The pulse could be lengthened to five microseconds containing 15 ⅓ microsecond chips. The number of phase codes in this case would be $4^{14}$.

Assuming an overall beacon noise figure of 6 dB including cable losses, a 10 MHz bandwith, a 30 mile distance (free space) and 50 watts (+47 dBm) radiated power, the path loss between the isotropic antenna at 1 GHz is 127 dB. Thus, the received signal is minus 74 dBM, which is 24 dB greater than the noise level of minus 98 dBm. At three miles, a signal to noise ratio of 44dB is obtained. Thus, 50 watts is clearly sufficient power.

To maintain compatibility with present-day DME sets, the MLS RF signal applied to their antenna leads must consist of a pair of X mode (12 microsecond spacing) or Y mode (30 microsecond spacing) pulses. Approximately 800 per second are required to ensure automatic gain control.

As previously described, the MLS adapter amplitude normalizes all on-channel incoming pulses, and generates the second pulse of the pair by delaying the first pulse an appropriate number of microseconds.

Figure 20:
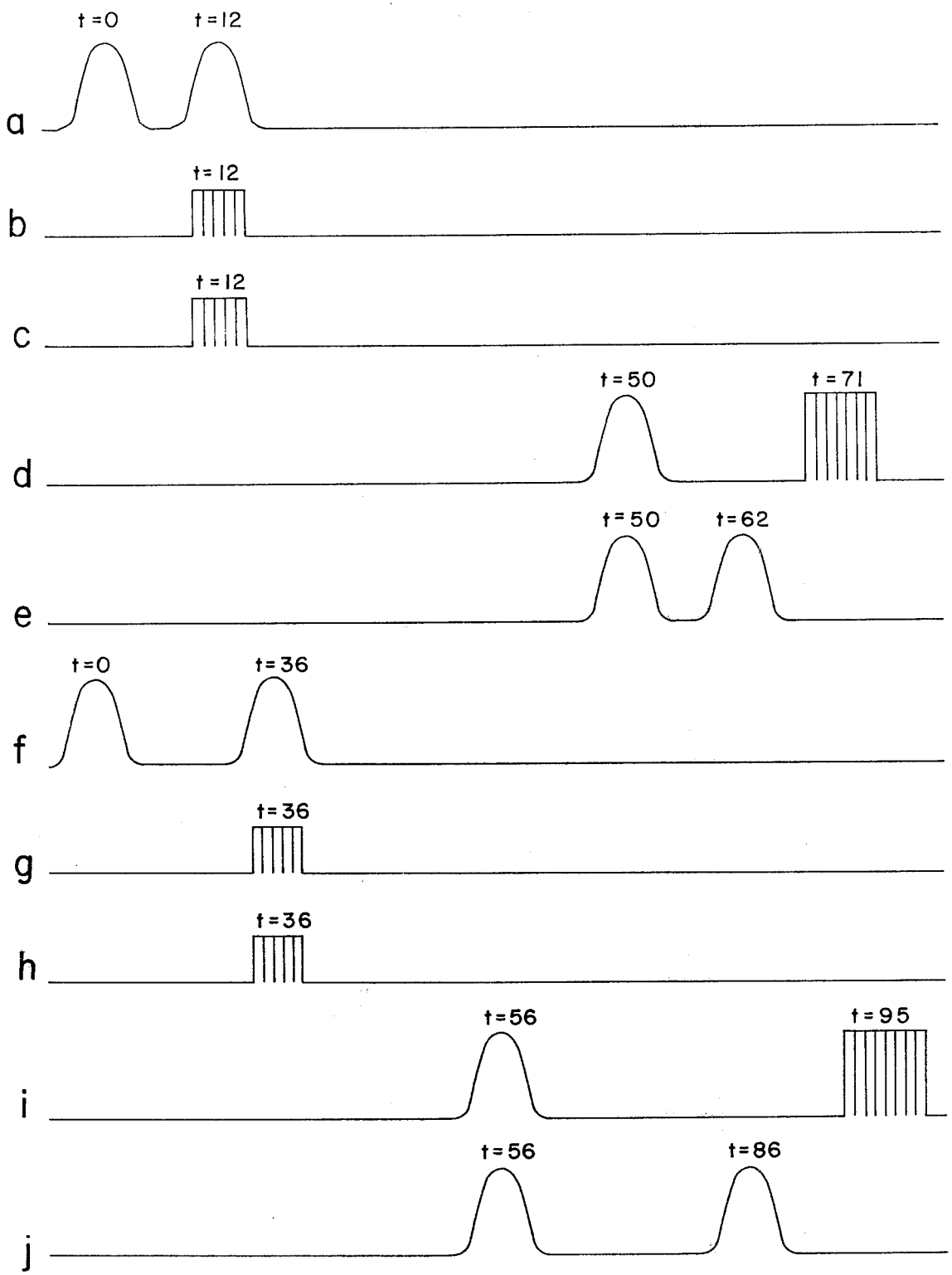

The significant preferred waveforms are shown in FIGS. 20a–e for the X mode and 20f–j for the Y mode. FIG. 20a shows the pulses generated by a standard airborne DME set operating in the X mode. FIG. 20b shows the phase coded pulse transmitted from the output of the MLS adapter, and FIG. 20c shows the interrogation pulse received by the beacon at 0 miles.

Note that the pulses in FIGS. 20b and c have been divided into 10 chips.

An MLS beacon transmits the standard DME Gaussian shaped pulse at 50 microseconds, and also transmits a fast rise time, phase coded pulse at 71 microseconds. This is shown in FIG. 20d. This signal will not interfere with a standard DME set since a decodable pulse pair does not exist to generate AGC or decodes.

If the ground beacon is co-located MLS - ILS beacon, it will respond to a phase coded pulse as above described and in addition, will respond to a standard interrogation (FIG. 20a) with standard pulse pair replies at 50 and 62 microseconds as shown in FIG. 20e. Note that no phase coded pulse is generated.

A standard ground beacon Tacan receiver would be incorporated in a combination beacon to receive the ILS/DME interrogations and to generate the triggers for the ILS/DME replies. FIGS. 20f-j illustrate the above procedure with respect to Y mode operation. The MLS station delay for both X and Y mode channels at 59 microseconds.

In addition to transmitting the pulses of FIGS. 20d and 20i, an MLS beacon will also transmit single Gaussian (squitter) pulses with no subsequent phase coded pulse so as to provide an AGC signal when no interrogations are being received. An automatic repetition rate control circuit will maintain the total number of Gaussian pulses transmitted at approximately 800 Hz. A combination MLS/ILS beacon will transmit pairs of pulses for squitter rather than single pulses.

A 15 chip 5 microsecond long bi-phase modulated signal is suggested as the MLS reply. This provides $2^{14}$ or 16,384 codes using differential phase shift detection, of which only 200 are required.

FIG. 21 is a block diagram of the transmitting portion of a combination MLS/ILS beacon. The transmitter can be activated by either an MLS trigger, an ILS trigger or a squitter trigger. Each of these triggers will pass through the priority and dead time circuitry 190 which gives first priority to MLS triggers, second priority to ILS triggers and third priority to squitter triggers. The dead time circuitry generates the required transmitter dead time in the well-known manner.

Assume first that no MLS or ILS triggers are being received. The peaks of the output of video noise generator 192 pass through threshold circuit 194 and delay circuit 196. In this way, the dead time circuitry is activated and OR-gate 198 is turned on. OR-gate 198 drives OR-gate 200 and an encoding delay circuit 203 which provides a 12 microsecond (X mode) or 30 microsecond (Y mode) delay. Thus, the output of OR-gate 200 is a pulse pair which passes through OR-gate 202 to a pulse shaper 204. Shaper 204 converts each input pulse into the shape required by the transmitter to produce a Gaussian shaped pulse. The output of shaper 204 passes through an analog summer 206 and thence to the power amplifier (transmitter) 208. Power amplifier 208 then generates the Gaussian shaped RF pulse pair which is applied to the transmitter/receiver switch 130 shown in FIG. 18.

The output of OR-gate 200 also drives a pulse rate counter and filter 210 which produces an output voltage proportional to the number of input pulse pairs. This voltage is used to control threshold 194 so that it passes approximately 800 noise peaks per second. Thus, sufficient Gaussian pulse pairs are radiated to generate AGC on a standard DME set or on a standard DME set equipped with the above described MLS adapter.

Next, assume that an ILS trigger has been received. The ILS trigger passes into and through the priority gating circuitry 190 and, if not inhibited, through a station delay 212 and OR-gate 198. From this point, it is processed in exactly the same manner as a squitter pulse as described above; the end result being the radiation of a Gaussian pair. Station delay 212 is a delay deliberately added to attain standard ICAO station delay. If, when the ILS trigger entered the priority circuit, delay circuit 196 contained a squitter pulse, it is dumped and the ILS trigger passed to station delay 212. Thus, the ILS trigger takes priority over the squitter trigger. If, on the other hand, a squitter pulse had just emerged from delay circuit 196, the dead time circuitry 190 would be activated and prevent ILS trigger from reaching station delay 212.

As the rate of ILS triggers increases, the number of squitter triggers decreases so as to maintain a transmission rate constant at approximately 800 pairs per second. As the number of ILS triggers increases (greater than 800) no transmissions due to squitter will occur, but the replies can build up to a traffic overload point of 3,000 to 4,000 pairs per second. Each time station delay 212 outputs a pulse, the dead time circuitry is activated.

Finally, assume that an MLS trigger is received. The trigger enters priority circuit 190. If a pulse is being processed in delay circuit 196 or station delay 212, it is dumped. If the dead time circuitry has not been activated, the MLS trigger will drive station delay circuit 214 which, in turn, drives OR-gate 202. An output from gate 202 results in the transmission of a Gaussian pulse as previously described. Station delay 214 also drives delay circuit 216 which, in turn, drives a pulse generator 218. The pulse generator produces a 5 microsecond rectangular pulse having fast rise and fall times. The rectangular pulse passes through summer 206 and then to the power amplifier 208. The output of delay 216 also drives a phase code generator 220 which generates a phase code unique to the MLS channel of the beacon. The output of phase code generator 220 is applied to the phase modulator 222. The output of phase modulator 222 is then applied to power amplifier 208. A preferred arrangement employs cosine shaped phase transitions. This phase modulation arrangement requires much less spectrum than would an arrangement which employs abrupt phase transitions. Thus, the MLS/ILS beacon radiates Gaussian pairs as replies to ILS interrogations and as squitters in addition to a Gaussian pulse followed (or perhaps preceded) by a phase coded rectangular pulse in reply to an MLS interrogation.

It should be understood that an MLS only beacon would not contain station delay 212, OR-gate 198, encoding delay 203, OR-gate 200 and the circuitry within the priority and dead time circuitry which is specifically associated with ILS. The output of delay 196 would drive OR-gate 202; pulse rate counter and filter 210 would count single pulses. Thus, all squitter pulses will be single Gaussian pulses and all MLS replies will be the same as previously described, i.e., a Gaussian pulse followed by a phase coded pulse.

FIG. 22 is a block diagram of a portion of airborne ILS/MLS receiver. The incoming RF signal is converted to IF by beating the signal with the output of a local oscillator 224 in a mixer 226. The difference frequency is selected by a band pass filter 228 having a bandwith of approximately 10 MHz. The output of filter 228 is amplified in a gain controlled linear amplifier 230. The output of amplifier 230 passes through the band pass filter 232 and amplifier 234 to a Ferris discriminator 236. Bandwidths of filter 232 and Ferris discriminator 236 are such that "on" channel signals provide an output having a positive polarity, and adjacent channel signals provide outputs having a negative polarity. Only "on" channel signals pass through sense detector 238. For NAV/ILS operation, delay circuit 240 is preset to 12 microseconds for X mode or 36 microseconds for Y mode. Thus, there will be an output from AND-gate 242, which output passes through switch 244 and "marks" the time of arrival of the pulse pair from the ground beacon. Of course, switch 244 is set in the ILS position as shown in FIG. 22. The output of AND-gate 242 also opens analog gate 246 allowing the first pulse of the pair to be applied to peak detector and filter 248. Peak detector and filter 248 develop the AGC voltage which is applied to amplifier 230. Thus far, the operation described is that of a conventional DME set.

For MLS/DME operation, the first pulse of a reply will be a Gaussian shaped pulse as shown in FIG. 20d. It will produce a pulse at the output of sense detector 238 which passes through presettable delay 240 to AND-gate 242.

The output of sense detector 238 also triggers a delay one-shot 250 which opens gate 252. The timing is such that the phase coded pulse, unique to MLS, passes through gate 252, amplifier 254 and limiter 256. The output of limiter 256 drives one port of a phase detector 258. It also drives a second port of phase detector 258 via delay circuit 260 having a delay equal to one chip (⅛ microsecond) of the phase coded pulse. Thus, the output of phase detector 258 will be a string of 1's and 0's corresponding to the differential phase of adjacent chips of the phase coded pulse.

The output of gate 252 is also applied to an envelope detector 262 having a fast rise time output which is applied to threshold comparator 264. The output of threshold comparator 264 becomes a digital one when the envelope detector 262 output exceeds a bias applied to threshold comparator 264. If this is the case, flip-flop 266 is set allowing clock pulses to pass through gate 268 to shift register 270, delay circuit 272 and counter 274. The control is designed to provide an output pulse when it reaches a count equivalent to the number of chips in a pulse (15). This, in turn, resets flip-flop 266, turning gate 268 off. This inhibits the clock pulses, resets counter 274 (and counter 276) to 0, and strobes the contents of read only memory 278 into the shift register 270.

During the time that the 15 output pulses passed through AND-gate 268 the output of shift register 270 was a serial string of pulses controlled by the channel phase code stored in ROM 278. The outputs of shift register 270 and phase detector 258 are applied to a modulo two adder 280. If the output of the phase detector is the complement of the shift register output, as it will be if the proper code has been received, the output of the modulo two adder will be 14 consecutive logical 1's. The "center" of each of the 1's is sampled in AND-gate 282. The output of AND-gate 282 is applied to counter 276 which counter, when it reaches a count of 14, generates a pulse which passes through switch 284 to AND-gate 242. Of course, switch 284 has been previously placed in the MLS position. The output pulse from counter 276 will be time coincident with the pulse from presettable delay 240; thus, there will be a decode output from AND-gate 242 which is applied to AND-gate 286. If the shift register and phase detector outputs are not complements, counter 276 will not reach a count of 14, there will be no output pulse, and counter 276 will be reset to 0 by the output of counter 274.

The output of threshold comparator 264 passes through delay circuit 288, which triggers a narrow one-shot 290. The narrow output of one-shot 290 is applied to AND-gate 286 where it is bracketed by the pulse from AND-gate 242. The output pulse of AND-gate 286 passes through switch 244 (switch 244 in the MLS position) and becomes the time of arrival pulse when in the MLS mode.

To produce an output pulse, the spacing between the Gaussian pulse and the phase coded pulse must be correct, the signal must be on the proper radio frequency as determined by the Ferris discriminator, and the phase code must be correct as sensed by counter 276.

While the principles of the invention have been described above in connection with specific apparatus, it is to be clearly understood that this description is made only by way of example and not as a limitation on the scope of the invention.

What is claimed is:

1. An Apparatus for generating interrogation signals for use with airborne equipment of the type which transmits interrogation signals containing at least one pulse of a first type to a ground beacon, said beacon of a type which responds to interrogation signals of a second type with reply signals of said second type, and wherein said airborne equipment processes reply signals of said first type, said airborne equipment including a transmitter, a receiver, an interrogator and an antenna, said apparatus comprising:
    means for detecting said first type of interrogation signal;
    means for converting said at least one pulse to at least one second pulse having a reduced amplitude;
    means for generating a coded signal; and
    means for modulating said at least one second pulse with said coded signal to produce an interrogation signal of said second type.

2. An apparatus according to claim 1 wherein said means for generating includes:
    a shift register;
    a read only memory for storing a plurality of codes having an output coupled to said shift register; and
    code selection means for accessing a particular one of said plurality of codes and applying it to said shift register.

3. An apparatus according to claim 1 wherein said modulating means comprises an amplitude modulator having as an input said at least one second pulse and the output of said means for generating.

4. An apparatus according to claim 1 wherein said means for modulating comprises a phase modulator having as inputs said at least one second pulse and the output of said means for generating.

5. An apparatus for use with airborne equipment of the type which transmits interrogation signals comprising at least one pulse of a first type to a ground beacon, said beacon of a type which responds to interrogation signals of a second type with reply signals of said second type and wherein said equipment processes reply signals of said first type, said airborne equipment including a transmitter, a receiver, an interrogator and an antenna, said apparatus comprising:
- means for detecting said first type interrogation signal;
- means for converting said at least one pulse to at least one second pulse having a reduced amplitude;
- means for generating a coded signal;
- means for modulating said at least one second pulse with said coded signal to produce an interrogation signal of said second type;
- means for receiving said reply signals of said second type; and
- means for converting said reply signals of said second type to said first type for processing in said airborne equipment.

6. In a distance measuring system, a beacon for receiving coded interrogation signals, processing interrogation signals having a correct code and generating a reply signal in response to said interrogation signals comprising:
- means for detecting the presence of an interrogation signal;
- means for decoding said interrogation signal to determine if it is one to which a response should be made;
- means for determining the frequency of said interrogation signal to determine if it is one to which a response should be made; and
- means for generating a coded reply signal in response to an interrogation having a correct code and frequency.

7. A beacon according to claim 6 wherein said means for decoding includes a phase decoder.

8. A beacon according to claim 6 wherein said means for decoding includes an amplitude decoder.

* * * * *